United States Patent
Kim (10) Patent No.: US 11,440,537 B2
(45) Date of Patent: Sep. 13, 2022

(54) APPARATUS AND METHOD FOR ESTIMATING POSITION IN AUTOMATED VALET PARKING SYSTEM

(71) Applicant: HYUNDAI MOBIS CO., LTD., Seoul (KR)

(72) Inventor: Dong Wook Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 49 days.

(21) Appl. No.: 16/810,669

(22) Filed: Mar. 5, 2020

(65) Prior Publication Data

US 2020/0298836 A1    Sep. 24, 2020

(30) Foreign Application Priority Data

Mar. 19, 2019    (KR) .......................... 10-2019-0031092

(51) Int. Cl.
*B60W 30/06* (2006.01)
*B60W 30/18* (2012.01)
(Continued)

(52) U.S. Cl.
CPC .......... *B60W 30/06* (2013.01); *B60W 30/181* (2013.01); *B60W 40/105* (2013.01);
(Continued)

(58) Field of Classification Search
CPC .. B60W 30/06; B60W 30/181; B60W 40/105; B60W 40/114; B60W 2120/04; B60W 40/02; B60W 50/00; B60W 50/02; B60W 50/0097; B60W 50/0205; B60W 2050/0026; B60W 2050/0078; B60W 2050/0215; B60W 2420/42; B60W 2520/14; B60W 2520/28; B60W 2540/18;
(Continued)

(56) References Cited

U.S. PATENT DOCUMENTS

2016/0097862 A1\* 4/2016 Yim ...................... G01C 21/165
701/472
2017/0039439 A1\* 2/2017 Kim ...................... G06V 20/586
(Continued)

FOREIGN PATENT DOCUMENTS

CN    109326136 A  *  2/2019

*Primary Examiner* — Aniss Chad
*Assistant Examiner* — Christopher George Fees
(74) *Attorney, Agent, or Firm* — Morgan, Lewis & Bockius LLP (57) ABSTRACT

An apparatus for estimating a position in an automated valet parking system includes a front camera processor processing a front image of a vehicle, a surround view monitor (SVM) processor recognizing a short-distance lane and stop line by processing a surround view image of the vehicle, a map data unit storing a high definition map, and a controller downloading a map including an area set as a parking zone from the map data unit when the entry of the vehicle to a parking lot is identified and correcting a position measurement value of the vehicle by performing map matching based on results of the recognition and processing of the front camera processor and SVM processor and the parking lot map of the map data unit when an automated valet parking start position is recognized based on the recognized short-distance lane and stop line.

11 Claims, 5 Drawing Sheets

(51) Int. Cl.
*B60W 40/105* (2012.01)
*B60W 40/114* (2012.01)
*G01C 21/16* (2006.01)
*G01C 21/30* (2006.01)
*G06V 20/58* (2022.01)

(52) U.S. Cl.
CPC ......... *B60W 40/114* (2013.01); *G01C 21/165* (2013.01); *G01C 21/30* (2013.01); *G06V 20/586* (2022.01); *B60W 2520/04* (2013.01)

(58) Field of Classification Search
CPC .......... B60W 2552/53; B60W 2556/40; G01C 21/165; G01C 21/30; G01C 21/005; G01C 21/1656; G01C 21/28; G01C 21/206; G01C 21/16; G06K 9/00812; G06K 9/00798; G06K 9/6292; G08G 1/16; G08G 1/168; G60W 50/14; G01S 19/42; B60Y 2300/06; B60Y 2306/15
See application file for complete search history.

(56) References Cited

U.S. PATENT DOCUMENTS

| | | | |
|---|---|---|---|
| 2018/0023961 A1 | 1/2018 | Fridman | |
| 2019/0367012 A1* | 12/2019 | Matta | G06K 9/00791 |
| 2020/0249695 A1* | 8/2020 | Otto | G05D 1/0088 |

* cited by examiner

APPARATUS AND METHOD FOR ESTIMATING POSITION IN AUTOMATED VALET PARKING SYSTEM

CROSS-REFERENCE TO RELATED APPLICATION

The present application claims priority to Korean Patent Application No. 10-2019-0031092 filed on Mar. 19, 2019 in the Korean Intellectual Property Office, which is incorporated herein by reference in its entirety.

BACKGROUND

1. Technical Field

Embodiments of the present disclosure relate to an apparatus and method for estimating a position in an automated valet parking system, and more particularly, to an apparatus and method for estimating a position in an automated valet parking system, which can estimate an initial position in an automatic valet parking (AVP) system using a surround view monitor (SVM).

2. Related Art

In general, an autonomous vehicle refers to a vehicle which autonomously determines a driving path by recognizing a surrounding environment using a function for detecting and processing external information upon driving and independently travels using its own power.

Positioning methods applied to autonomous vehicles include a satellite positioning method based on a global navigation satellite system (GNSS), such as a global positioning system (GPS), a differential GPS (DGPS) or network-real time kinematic (RTK), vehicle behavior-based dead reckoning for correcting satellite positioning using vehicle sensors and an inertial measurement unit (IMU) (e.g., a vehicle speed, a steering angle, and a wheel odometer/yaw rate/acceleration), and a map-matching method of relatively estimating the position of a vehicle by comparing a precise map for autonomous driving with data from various sensors (e.g., a camera, a stereo camera, an SVM camera, and a radar).

Recently, automated valet parking (AVP) has been developed for more convenient parking. An autonomous vehicle on which an AVP system has been mounted can autonomously travel without a driver, search for a parking space, and perform parking or exit from a parking lot. Furthermore, even a function for performing parking by extending a target parking space to a surrounding parking lot in a traffic congestion area has been developed.

Accordingly, a positioning method for estimating a position becomes important. However, a conventional satellite positioning method has problems in that the method is very expensive because it requires a high definition GPS, a high definition radar, and a high resolution camera, that the method has low processing speed and accuracy because it is configured with a complicated algorithm, and that the method cannot constantly maintain its performance because it is influenced by characteristics of a road and characteristics of surrounding geographic features.

The related art of the disclosure is disclosed in U.S. Patent Application Publication No. 2018-0023961 (Jan. 25, 2018) entitled "SYSTEMS AND METHODS FOR ALIGNING CROWDSOURCED SPARSE MAP DATA."

SUMMARY

Various embodiments are directed to the provision of an apparatus and method for estimating a position in an automated valet parking system, which can estimate an initial position of an automatic valet parking (AVP) system without expensive equipment using a surround view monitor (SVM).

In an embodiment, an apparatus for estimating a position in an automated valet parking system includes a front camera processor configured to process a front image of a vehicle, a surround view monitor (SVM) processor configured to recognize a short-distance lane and a stop line by processing a surround view image of the vehicle, a map data unit configured to store a high definition map, and a controller configured to download a map including an area set as a parking zone from the map data unit when the entry of the vehicle to a parking lot is identified and to correct a position measurement value of the vehicle by performing map matching based on the results of the recognition and processing of the front camera processor and the SVM processor and the parking lot map of the map data unit when an automated valet parking (AVP) start position is recognized based on the short-distance lane and stop line recognized by the SVM processor.

In an embodiment, the controller is configured to predict a behavior of the vehicle through dead reckoning when the AVP start position is recognized and to estimate an AVP initial position of the vehicle by fusing the position measurement value of the vehicle corrected through the map matching and the predicted behavior of the vehicle.

In an embodiment, the controller includes a vehicle behavior prediction unit configured to predict a behavior of the vehicle through dead reckoning based on GPS information received from a GPS receiver and a vehicle steering wheel angle, yaw rate and wheel speed received from a vehicle sensor unit.

In an embodiment, the controller includes a map-matching unit configured to perform the map matching based on at least one of lane fusion data in which a long-distance lane recognized by the front camera processor and the short-distance lane and stop line recognized by the SVM processor have been fused, parking lot map data from the map data unit, and vehicle behavior data for each time predicted through dead reckoning.

In an embodiment, the map-matching unit is configured to compute a position and rotation correction quantity in which a distance error between sensor data and map data is minimized using iterative closest point (ICP) logic.

In an embodiment, the controller includes a position fusion unit configured to fuse a vehicle pose output as the results of the map matching and GPS information of a vehicle position predicted through dead reckoning.

In an embodiment, the controller includes a fail-safe diagnosis unit configured to receive the vehicle position and flags output by the position fusion unit and to perform fail-safe diagnosis. The fail-safe diagnosis unit is configured to perform the fail-safe diagnosis using a distribution chart configured with estimated positioning results in which positioning results at past timing have been projected on current timing and positioning results input at current timing.

In an embodiment, the vehicle pose includes one or more of longitude, latitude, heading, covariance, warning/fail/safe, flags and a lane offset.

In an embodiment, a method of estimating a position in an automated valet parking system includes downloading, by a controller, a map including an area set as a parking zone from a map data unit for storing a high definition map when the entry of a vehicle to a parking lot is identified, recognizing, by the controller, an automated valet parking (AVP) start position based on a short-distance lane and stop line recognized by a surround view monitor (SVM) processor, and correcting, by the controller, a position measurement value of the vehicle by performing map matching based on the results of the recognition and processing of a front camera processor and the SVM processor and the parking lot map of the map data unit.

In an embodiment, the method further includes predicting, by the controller, a behavior of the vehicle through dead reckoning when the AVP start position is recognized and estimating, by the controller, an AVP initial position of the vehicle by fusing the position measurement value of the vehicle corrected through the map matching and the predicted behavior of the vehicle.

In an embodiment, in the predicting of the behavior of the vehicle, the controller predicts the behavior of the vehicle through dead reckoning based on GPS information received from a GPS receiver and a vehicle steering wheel angle, yaw rate and wheel speed received from a vehicle sensor unit.

In an embodiment, in the correcting of the position measurement value, the controller performs the map matching based on at least one of lane fusion data in which a long-distance lane recognized by the front camera processor and the short-distance lane and stop line recognized by the SVM processor have been fused, parking lot map data from the map data unit, and vehicle behavior data for each time predicted through dead reckoning.

In an embodiment, in the correcting of the position measurement value, the controller computes a position and rotation correction quantity in which a distance error between sensor data and map data is minimized using iterative closest point (ICP) logic.

In an embodiment, in the estimating of the AVP initial position, the controller fuses a vehicle pose output as results of the map matching and GPS information of a vehicle position predicted through dead reckoning.

In an embodiment, the method further includes receiving, by the controller, the vehicle position and flags output as the result of the position fusion and performing fail-safe diagnosis. In the performing of the fail-safe diagnosis, the controller performs the fail-safe diagnosis using a distribution chart configured with estimated positioning results in which positioning results at past timing have been projected on current timing and positioning results input at current timing.

DETAILED DESCRIPTION

Hereinafter, an apparatus and method for estimating a position in an automated valet parking system according to embodiments of the present disclosure are described with reference to the accompanying drawings. For clarity and convenience in this description, thicknesses of lines, sizes of constituent elements, and the like are illustrated in an exaggerated manner in the drawings.

Furthermore, terms to be described hereunder have been defined by taking into consideration functions in the present disclosure, and may be different depending on a user, an operator's intention or practice. Accordingly, each term should be defined based on contents over the entire specification.

Furthermore, an implementation described in this specification may be realized as a method or process, apparatus, software program, data stream or signal, for example. Although the disclosure has been discussed only in the context of a single form of an implementation (e.g., discussed as only a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device, which facilitates the communication of information between end-users.

Figure 1:
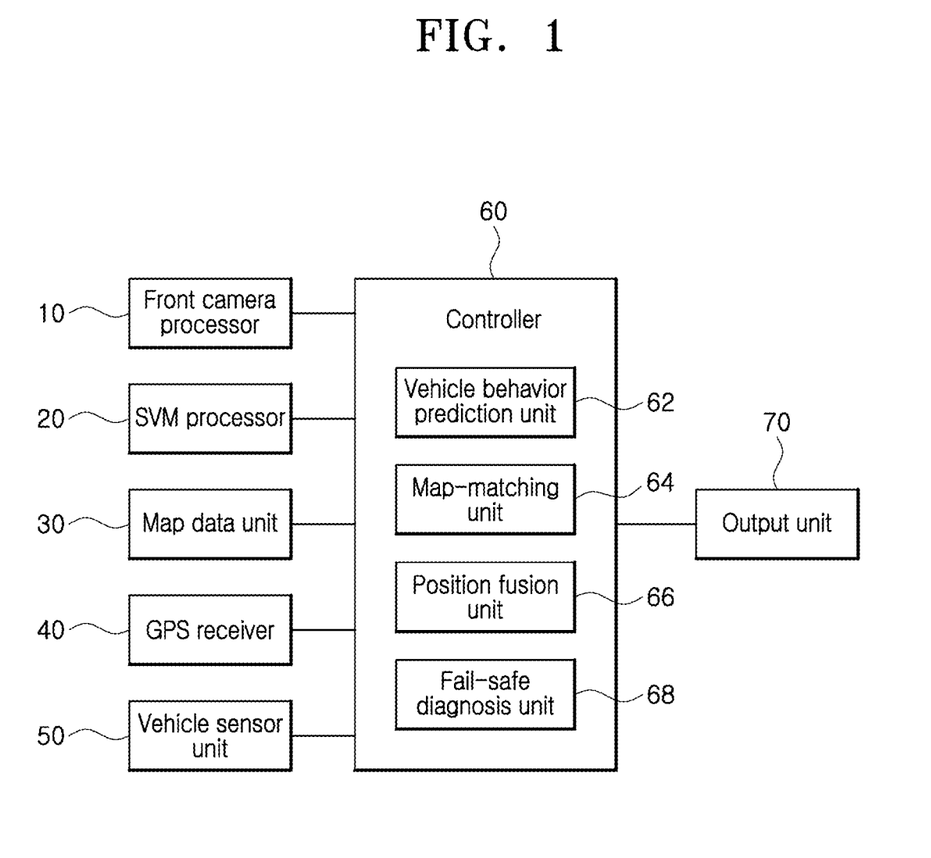
FIG. 1 is a block diagram illustrating an apparatus for estimating a position in an automated valet parking system according to an embodiment of the disclosure.
Figure 2:
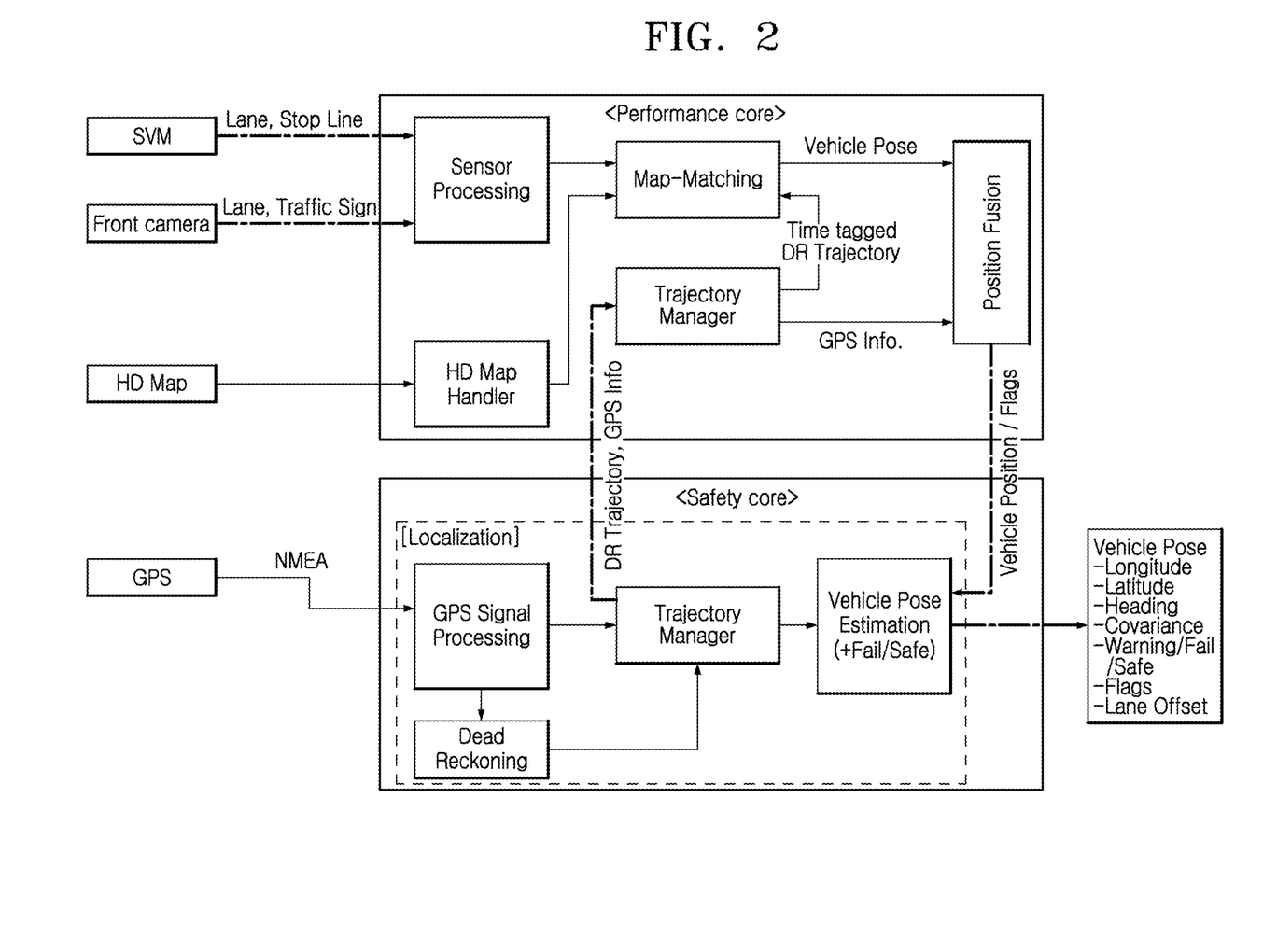
FIG. 2 is a diagram more specifically describing the apparatus for estimating a position in an automated valet parking system according to an embodiment of the disclosure.
Figure 5:
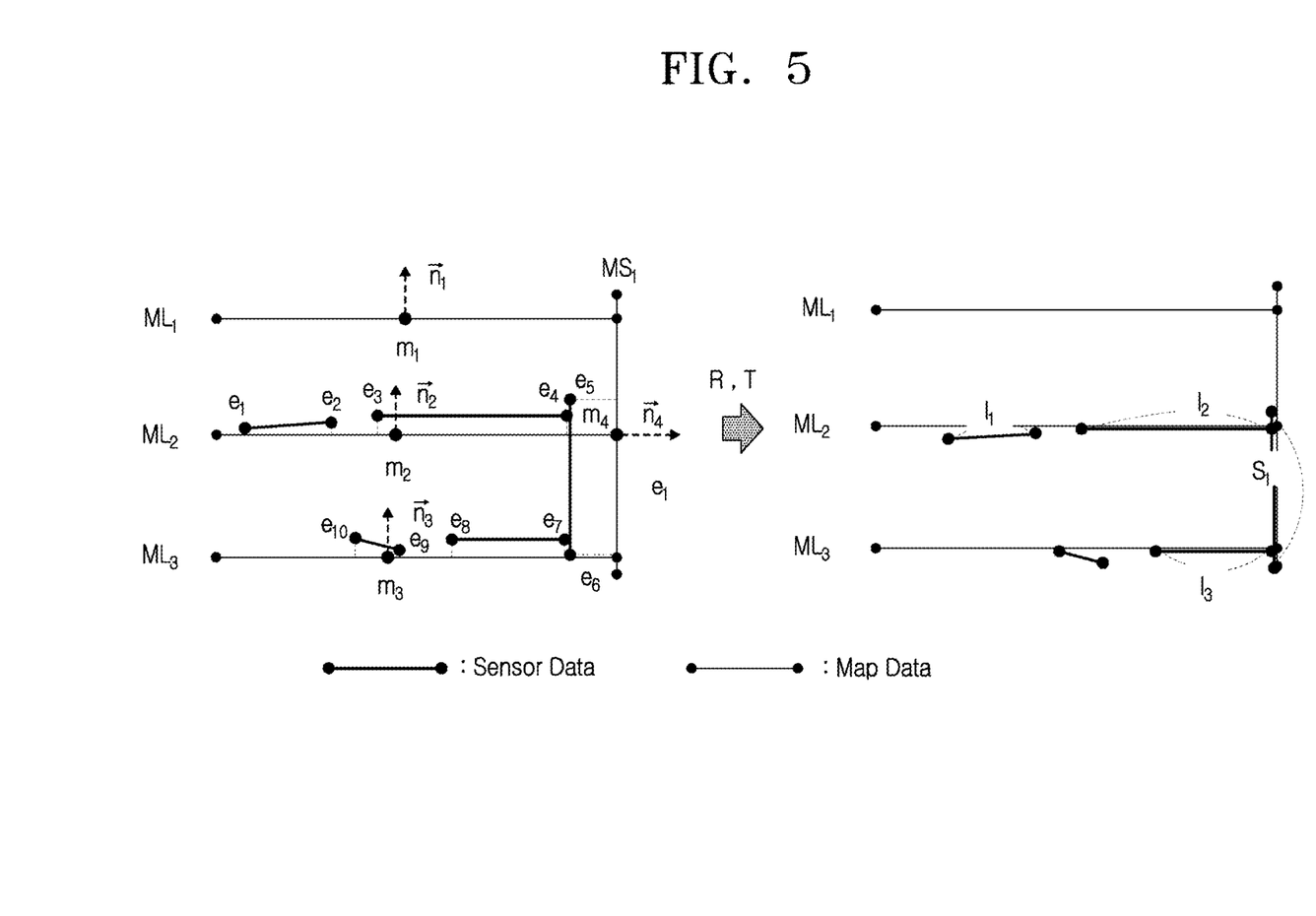
FIG. 5 is a diagram for describing map-matching logic for the apparatus and method for estimating a position in an automated valet parking system according to an embodiment of the disclosure.

FIG. 1 is a block diagram illustrating an apparatus for estimating a position in an automated valet parking system according to an embodiment of the disclosure. FIG. 2 is a diagram more specifically describing the apparatus for estimating a position in an automated valet parking system according to an embodiment of the disclosure. FIG. 5 is a diagram for describing map-matching logic for the apparatus and method for estimating a position in an automated valet parking system according to an embodiment of the disclosure. The apparatus for estimating a position in an automated valet parking system is described below with reference to FIGS. 1, 2 and 5.

As illustrated in FIG. 1, the apparatus for estimating a position in an automated valet parking system according to an embodiment of the disclosure includes a front camera processor 10, a surround view monitor (SVM) processor 20, a map data unit 30, a GPS receiver 40, a vehicle sensor unit 50, a controller 60 and an output unit 70.

As publicly known in the art, some of exemplary embodiments may be illustrated in the accompanying drawings from the viewpoint of function blocks, units, section, and/or modules. Those skilled in the art will understood that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in this specification. Furthermore, each of the blocks, units and/or modules may be implemented by dedicated hardware or a combination of dedicated hardware for performing some functions and a processor for performing another function (for example, one or more programmed processors and related circuits). In some exemplary embodiments, each of the blocks, units and/or modules may be physically divided into two or more blocks, units and or modules which are interactive and discrete, without departing from the scope of the disclosure. Furthermore, blocks, units and/or modules in some exemplary embodiments may be physically coupled as a more complex block, unit and/or module without departing from the scope of the disclosure.

First, the present embodiment is for estimating an initial position in an automated valet parking (AVP) system using an SVM, which facilitates parking by allowing surrounding spaces of a vehicle to be seen within the vehicle through cameras attached to the front, back and sides of the vehicle. That is, the present embodiment relates to a vehicle positioning device, and can measure the position of a vehicle using images captured by cameras without expensive equipment, a stop line, etc. and improve the accuracy of map matching.

The front camera processor 10 may receive a front image of a vehicle from a front camera of the vehicle, and may recognize a long-distance lane and a traffic sign by processing the front image of the vehicle.

Furthermore, the front camera processor 10 may include inside lane recognition means for recognizing an inside lane in the front image, lane tracking means for tracking a lane having the same characteristic as the recognized lane, and reliability computation means.

The inside lane recognition means may recognize a lane having a solid line or dotted-line form with a specific color (e.g., white, or yellow) in a front image.

The lane tracking means may track a lane having the same characteristics within a pre-designated margin although components (e.g., color, thickness, and form) of the recognized lane do not partially maintain the same characteristics (e.g., the same line color, the same line thickness, and the same line interval) by considering a flow (or direction) of the recognized lane.

Furthermore, the reliability computation means may compute the ratio (i.e., lane component matching ratio) in which the components (e.g., color, thickness, and form) of the tracked lane are identical with pre-designated reference values for each component. As the computed lane component matching ratio is closer to 100%, this means high reliability. In contrast, as the computed lane component matching ratio is closer to 0%, this means low reliability. Furthermore, the reliability computation means may predict a current lane (i.e., predicted lane) using the results of the recognition of a previous lane and motion information of a vehicle, and may compute reliability in such a way to compare the predicted lane with a current lane recognized in the front image and increase a reliability count (or reliability score) when a difference between the predicted lane and the current lane is a preset threshold or less. When the reliability count is more than the preset threshold, the reliability computation means may determine that corresponding lane recognition is valid (i.e., the corresponding lane is a valid lane).

The SVM processor 20 may recognize a short-distance lane and a stop line by processing a surround view image of a vehicle.

Furthermore, the SVM processor 20 functions to recognize a lane in a surround view image (or surround view composition image). The surround view image means an image obtained by composing, in a top view or surround view form, surrounding images (e.g., front, side, and back images) of a vehicle captured by one or more cameras. Accordingly, the SVM processor 20 may recognize a lane (i.e., short-distance lane) in an area close to a vehicle.

In this case, the cameras are disposed on the front, back, left and right sides of the vehicle. In order to increase a degree of completion of the top view or surround view image and prevent a photographing blind spot from occurring, additional cameras may also be disposed on the upper sides at the front and back of the vehicle, that is, relatively higher positions than the positions of the cameras disposed on the front, back, left and right sides.

Furthermore, like the front camera processor 10, the SVM processor 20 may include inside lane recognition means, lane tracking means and reliability computation means.

That is, the inside lane recognition means may recognize an inside lane in a surround view image, and may recognize a lane having a solid line or a dotted-line form with a specific color (e.g., white or yellow) in the surround view image. In the present embodiment, in particular, the inside lane recognition means may recognize a stop line.

The lane tracking means may track a lane having the same characteristics within a pre-designated margin although components (e.g., color, thickness, and form) of the recognized lane do not partially maintain the same characteristics (e.g., the same line color, the same line thickness, and the same line interval) by considering a flow (or direction) of the recognized lane.

Furthermore, the reliability computation means may compute the ratio (i.e., lane component matching ratio) in which the components (e.g., color, thickness, and form) of the tracked lane are identical with pre-designated reference values for each component. As the computed lane component matching ratio is closer to 100%, this means high reliability. In contrast, as the computed lane component matching ratio is closer to 0%, this means low reliability. Furthermore, the reliability computation means may predict a current lane (i.e., predicted lane) using the results of the recognition of a previous lane and motion information of a vehicle, and may compute reliability in such a way to compare the predicted lane with a current lane recognized in the surround view image and increase a reliability count (or reliability score) when a difference between the predicted lane and the current lane is a preset threshold or less. When the reliability count is more than the preset threshold, the reliability computation means may determine that corresponding lane recognition is valid (i.e., the corresponding lane is a valid lane).

The short-distance lane may mean a lane in an area, which may be recognized in a surround view image. The long-distance lane may mean a lane in a long-distance area, which may be recognized in a front image.

The map data unit 30 stores a high definition map in which information on roads and surrounding terrains has been constructed with high precision, and provides the high definition map in response to a request from the controller 60. In the present embodiment, in particular, the map data unit 30 may store a high definition (HD) map for a parking lot (i.e., area set as a parking zone).

The GPS receiver 40 receives GPS signals from satellites and provides the GPS signals to the controller 60 so that the position of a vehicle can be set based on a current position.

The vehicle sensor unit 50 means various sensors within a vehicle. In the present embodiment, in particular, the vehicle sensor unit 50 may include a vehicle steering wheel angle sensor, yaw rate sensor and wheel speed sensor for vehicle behavior prediction.

The controller 60 identifies that a vehicle enters an area set as a parking lot or parking zone, and downloads a map for the corresponding area. That is, when the entry of a vehicle to a parking lot is identified, the controller 60 may download, from the map data unit 30, a map including an area set as the parking zone.

Furthermore, the controller 60 may recognize an AVP start position based on a short-distance lane and stop line recognized by the SVM processor 20.

At this time, the controller 60 may generate a single fused lane (i.e., a single lane not divided into a short-distance lane and a long-distance lane) by fusing a lane recognized by the SVM processor 20 and a lane recognized by the front camera processor 10.

That is, the controller 60 may fuse lanes through a lane error comparison, may determine a valid lane, and may generate a fused lane.

The controller 60 computes (or determines) a position error (e.g., an interval between the ends of lanes in a vehicle reference coordinate system and an angle of each lane) by comparing the lane (i.e., short-distance lane) recognized by the SVM processor 20 and the lane (i.e., long-distance lane) recognized by the front camera processor 10. In this case, the vehicle reference coordinate system means a coordinate system indicative of a traverse coordinates X, longitudinal coordinates Y and vehicle movement direction θ corresponding to a moved distance and direction of a vehicle with respect to the center of the vehicle.

When the position error is within a preset permission range as a result of the comparison between the two lanes (i.e., the long-distance lane and the short-distance lane), the controller 60 generates a single fused lane (i.e., a single lane not divided into the short-distance lane and the long-distance lane) by fusing the two lanes (i.e., the long-distance lane and the short-distance lane). Furthermore, when the position error is out of the preset permission range as a result of the comparison between the two lanes (i.e., the long-distance lane and the short-distance lane), the controller 60 does not fuse the two lanes (i.e., the long-distance lane and the short-distance lane) and determines a lane having relatively high reliability as a valid lane.

Accordingly, the controller 60 may determine that the two lanes (i.e., the long-distance lane and the short-distance lane) are not valid lanes when the reliability of each lane is smaller than the preset threshold. The controller 60 may generate a single fused lane (i.e., a single lane not divided into the short-distance lane and the long-distance lane) by fusing the two lanes when the reliability of each of the two lanes is the preset threshold or more and the position error between the two lanes is within the preset permission range. The controller 60 may determine a lane having relatively higher reliability, among the two lanes, as a valid lane when the position error between the two lanes is out of the preset permission range.

Furthermore, the controller 60 includes a vehicle behavior prediction unit 62, a map-matching unit 64, a position fusion unit 66 and a fail-safe diagnosis unit 68. The controller 60 may predict a behavior of a vehicle through dead reckoning, may correct a position measurement value of the vehicle through map matching based on the results of the recognition and processing of the front camera processor 10 and the SVM processor 20 and the parking lot map of the map data unit 30, and may finally estimate an AVP initial position of the vehicle by fusing the predicted behavior of the vehicle and the corrected position measurement value of the vehicle.

The vehicle behavior prediction unit 62 may predict a behavior of a vehicle through dead reckoning based on GPS information received from the GPS receiver 40 and a vehicle steering wheel angle, yaw rate and wheel speed received from the vehicle sensor unit 50.

Furthermore, the map-matching unit 64 may perform map matching based on at least one of lane fusion data in which a long-distance lane recognized by the front camera processor 10 and a short-distance lane and stop line recognized by the SVM processor 20 have been fused, parking lot map data from the map data unit 30, and vehicle behavior data for each time predicted through dead reckoning.

At this time, the map-matching unit 64 may compute a position and rotation correction quantity in which a distance error between sensor data and map data is minimized using iterative closest point (ICP) logic. The ICP logic is a method of registering current data with the existing data set, and is a method of finding an association based on the closest points of data, moving and rotating current data based on the association, and adding the current data to the existing data set.

For example, a position T and a rotation (R) correction quantity may be computed with reference to the following equation and FIG. 5.

$$\text{minimize } E = \sum_{i=1}^{N} e_i = \sum_{i=1}^{N} w_i((R \cdot l_i + T - m_{pair,i}) \cdot \eta_{pair,i})^2$$

Furthermore, the position fusion unit 66 may fuse a vehicle pose, output as the results of the map matching, and the GPS information of the vehicle position predicted through dead reckoning.

In this case, the position fusion unit 66 may be implemented like the method of fusing lanes recognized by the SVM processor 20 and the front camera processor 10, but may fuse position measurement values using another method.

The controller 60 includes the fail-safe diagnosis unit 68 for receiving a vehicle position and flags output by the position fusion unit 66 and performing fail-safe diagnosis. The fail-safe diagnosis unit 68 may perform fail-safe diagnosis using a distribution chart configured with estimated positioning results in which positioning results at the past timing have been projected on current timing and positioning results input at current timing.

In the present embodiment, the vehicle pose may include one or more of longitude, latitude, heading, covariance, warning/fail/safe, flags and a lane offset.

That is, in the present embodiment, the output unit 70 may output the results of the diagnosis of the fail-safe diagnosis unit 68. In this case, the output unit 70 may output the results of fail-safe diagnosis of vehicle pose information.

In the present embodiment, an autonomous driving system can perform sensor fusion positioning based on map matching, and can perform fail-safe diagnosis for improving the reliability of the system and enabling the computation (or calculation or estimation) of robust and stable positioning information in a process of performing sensor fusion positioning. Furthermore, in the present embodiment, the fail-safe diagnosis does not require additional hardware because it is analytic redundancy-based fault diagnosis, but the disclosure is not limited thereto.

Referring to FIG. 2, the present embodiment may basically include a performance core for performing a process of fusing a position measurement value, corrected through map matching, and the predicted results of a vehicle behavior and a safety core for performing fail-safe diagnosis on a vehicle position fused in the performance core.

In the performance core, the front camera processor 10 and the SVM processor 20 may perform sensor value processing, and the map data unit 30 may download and manage a map. Furthermore, in the safety core, the GPS receiver 40 may perform GPS signal processing.

Furthermore, in the controller 60, the map-matching unit 64 and the position fusion unit 66 may be included in the performance core, and the vehicle behavior prediction unit 62 and the fail-safe diagnosis unit 68 may be included in the safety core, but the disclosure is not limited thereto.

In other words, the performance core receives lanes and a stop line from an SVM, and receives lanes and a traffic sign from a front camera. Furthermore, the performance core may process recognition data, that is, sensor values received from the SVM and the front camera. In other words, the controller 60 may fuse recognition data from the SVM and the front camera, may download the HD map of a parking zone, and may perform map matching. In this case, the controller 60 may perform map matching using GPS signals, vehicle trajectory information predicted through dead reckoning, and GPS information. Furthermore, the controller 60 may fuse a vehicle pose (or position) corrected through the map matching and a position value based on the GPS information, and may finally estimate an initial position in the automated valet parking system by performing fail-safe diagnosis on the fused results.

Figure 3:
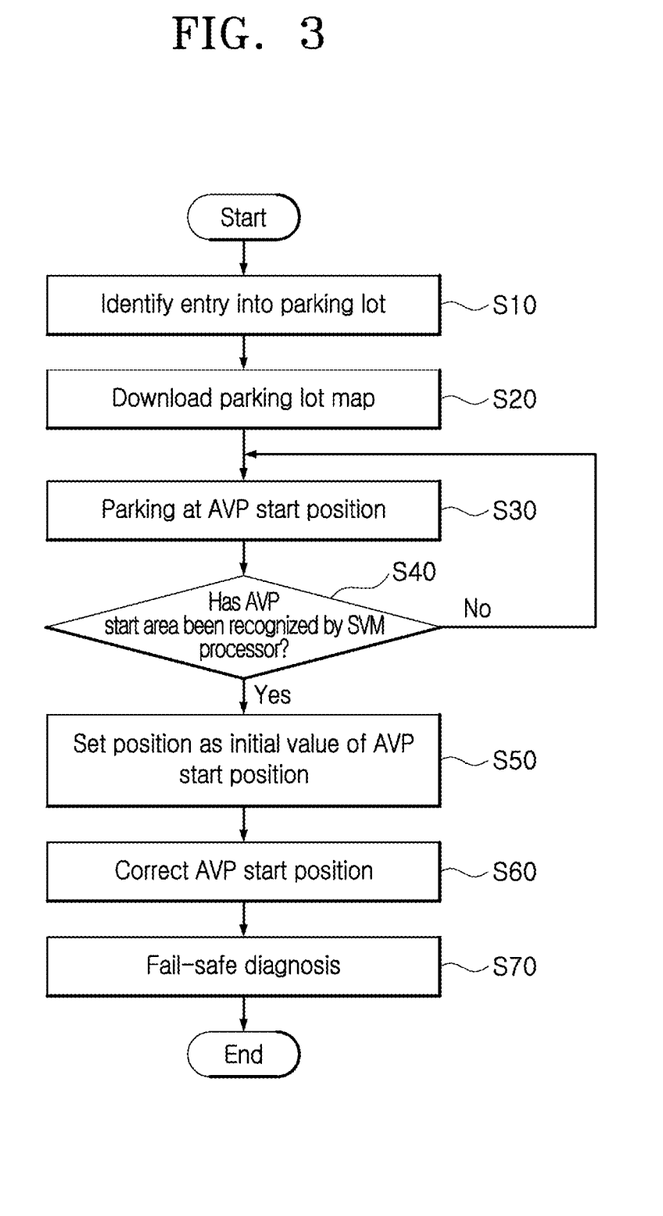
FIG. 3 is a flowchart for describing a method of estimating a position in an automated valet parking system according to an embodiment of the disclosure.
Figure 4:
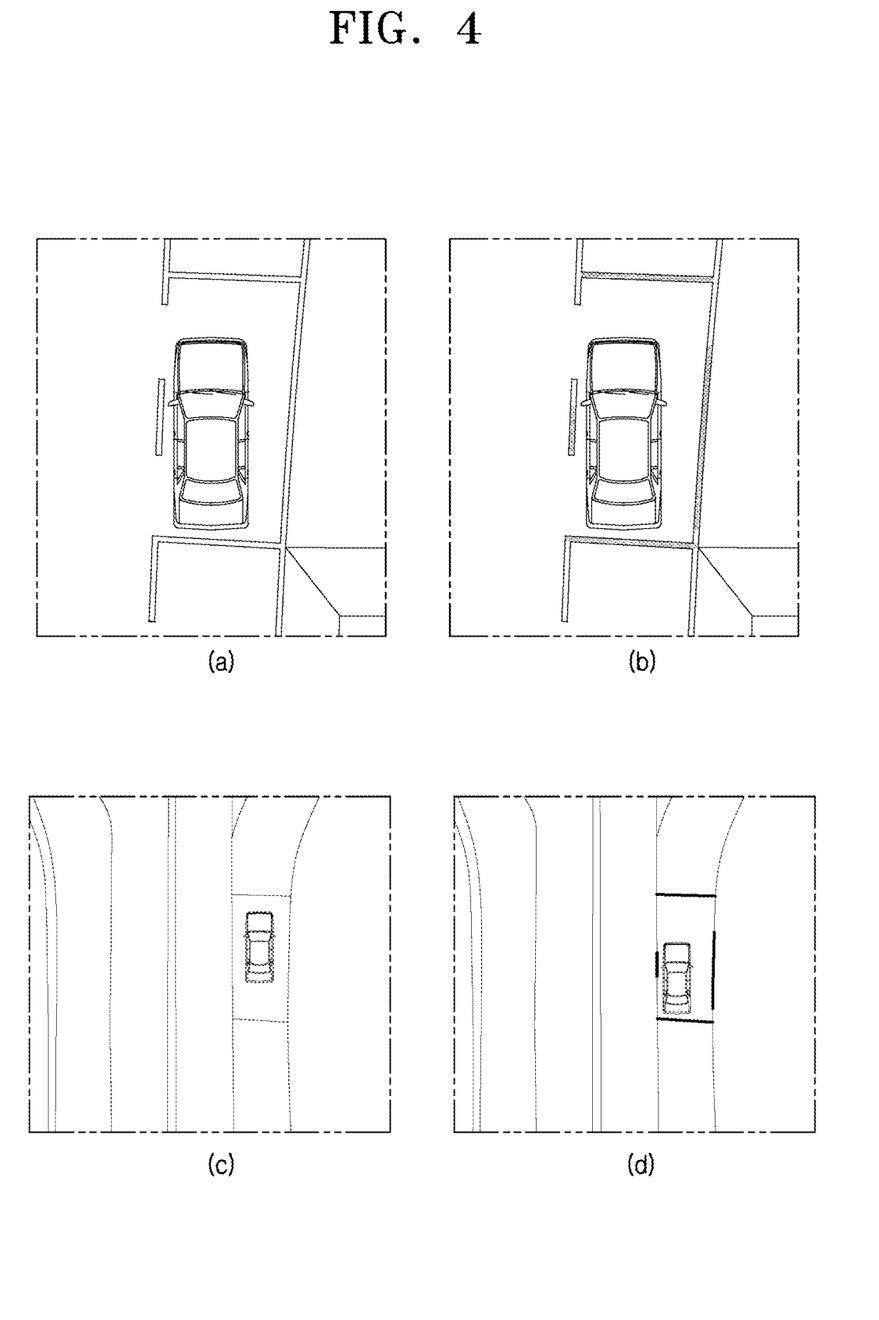
FIG. 4 is an exemplary diagram of an apparatus and method for estimating a position in an automated valet parking system according to an embodiment of the disclosure.

FIG. 3 is a flowchart for describing a method of estimating a position in an automated valet parking system according to an embodiment of the disclosure. FIG. 4 is an exemplary diagram of an apparatus and method for estimating a position in an automated valet parking system according to an embodiment of the disclosure. The method of estimating a position in an automated valet parking system is described below with reference to FIGS. 3 and 4.

As illustrated in FIG. 3, in the method of estimating a position in an automated valet parking system according to an embodiment of the disclosure, first, the controller 60 identifies that a vehicle enters a parking lot (S10).

In this case, the controller 60 may identify that the vehicle enters the parking lot by receiving a vehicle position from the GPS receiver 40, but the disclose is not limited to such a method.

Furthermore, when the entry of the vehicle to the parking lot is identified, the controller 60 downloads a map including an area set as the parking zone from the map data unit 30 in which a high definition (HD) map is stored (S20).

Furthermore, if it is identified that the vehicle has parked at an AVP start position (S30), the controller 60 determines whether an AVP start area has been recognized through the SVM processor 20 (S40).

That is, when the vehicle parks at an AVP start position as illustrated in FIG. 4(*a*), the controller 60 may recognize the AVP start position based on a short-distance lane and stop line recognized by the SVM processor 20, as illustrated in FIG. 4(*b*).

If an AVP start area is not recognized through the SVM processor 20, the controller 60 may return to step S30 and perform AVP start position parking. The AVP start position parking may be performed by a user. The controller 60 may identify that the vehicle has parked at the AVP start position by receiving GPS information or a signal, indicating that the vehicle has parked, from AVP infrastructure installed in the parking lot.

Furthermore, the controller 60 sets a position as an initial value of the AVP start position (S50).

That is, as illustrated in FIG. 4(*c*), the controller 60 may set the position as the initial value of the AVP start position based on the AVP start area recognized through the SVM processor 20.

Furthermore, as illustrated in FIG. 4(*d*), the controller 60 corrects the AVP start position (S60).

At this time, the controller 60 may predict a behavior of the vehicle through dead reckoning, and may correct a position measurement value of the vehicle through map matching based on the results of the recognition and processing of the front camera processor 10 and the SVM processor 20 for recognizing a long-distance lane and a traffic sign and the parking lot map of the map data unit 30.

Furthermore, the controller 60 may finally estimate an AVP initial position of the vehicle by fusing the corrected position measurement value of the vehicle and the predicted behavior of the vehicle.

In this case, the controller 60 may predict the behavior of the vehicle through dead reckoning based on the GPS information received from the GPS receiver 40 and a vehicle steering wheel angle, yaw rate and wheel speed received from the vehicle sensor unit 50. Furthermore, the controller 60 may perform map matching based on at least one of lane fusion data in which a long-distance lane recognized by the front camera processor 10 and a short-distance lane and stop line recognized by the SVM processor 20 have been fused, parking lot map data from the map data unit 30, and vehicle behavior data for each time predicted through dead reckoning.

In the present embodiment, the controller 60 may compute a position and rotation correction quantity in which a distance error between sensor data and map data is minimized using iterative closest point (ICP) logic.

Furthermore, the controller 60 may fuse a vehicle pose, output as the results of the map matching, and the GPS information of the vehicle position predicted through dead reckoning.

Finally, the controller 60 may receive a vehicle position and flags output as the results of the position fusion, and may perform fail-safe diagnosis (S70).

In this case, the controller 60 may perform the fail-safe diagnosis using a distribution chart configured with estimated positioning results in which positioning results at the past timing have been projected on current timing and positioning results input at current timing. In this case, the vehicle pose may include one or more of longitude, latitude, heading, covariance, warning/fail/safe, flags and a lane offset.

As described above, the apparatus and method for estimating a position in an automated valet parking system according to embodiments of the disclosure can perform map matching without expensive equipment and estimate an initial position regardless of the inside and outside by estimating the initial position in an automated valet parking (AVP) system using a surround view monitor (SVM) and can improve map matching accuracy through increased cognition distance accuracy (i.e., correction accuracy) by performing measurement in the proximity of geographic features.

Although preferred embodiments of the present disclosure have been disclosed for illustrative purposes, those skilled in the art will appreciate that various modifications, additions and substitutions are possible, without departing from the scope of the present disclosure as defined in the accompanying claims.

Thus, the true technical scope of the present disclosure should be defined by the following claims.

What is claimed is:

1. An apparatus for estimating a position in an automated valet parking system, the apparatus comprising:
 a front camera configured to capture a front image of a vehicle;
 a front camera processor configured to process the front image of the vehicle received from the front camera;
 a surround view monitor (SVM) processor configured to recognize a short-distance lane and a stop line by processing a surround view image of the vehicle;
 a map data unit configured to store a high definition map; and
 a controller configured to:
  download a map comprising an area set as a parking zone from the map data unit when an entry of the vehicle to a parking lot is identified, and
  correct a position measurement value of the vehicle by performing map matching based on results of a recognition and processing of the front camera processor and the SVM processor and the parking lot map of the map data unit, when an automated valet parking (AVP) start position is recognized based on the short-distance lane and stop line recognized by the SVM processor and when it is determined that the vehicle has parked at the AVP start position by receiving GPS information received from a GPS receiver or a signal, indicating that the vehicle has parked, from AVP infrastructure installed in the parking lot,
 wherein the controller comprises a vehicle behavior prediction unit configured to predict a behavior of the vehicle through dead reckoning based on the GPS information received from the GPS receiver and a vehicle steering wheel angle, yaw rate and wheel speed received from a vehicle sensor unit, and
 wherein the controller comprises a map-matching unit configured to perform the map matching based on lane fusion data in which a long-distance lane recognized by the front camera processor and the short-distance lane and stop line recognized by the SVM processor have been fused, parking lot map data from the map data unit, and vehicle behavior data for each time predicted through dead reckoning.

2. The apparatus of claim 1, wherein the controller is configured to:
 predict a behavior of the vehicle through dead reckoning when the AVP start position is recognized, and
 estimate an AVP initial position of the vehicle by fusing the position measurement value of the vehicle corrected through the map matching and the predicted behavior of the vehicle.

3. The apparatus of claim 1, wherein the map-matching unit is configured to compute a position and rotation correction quantity in which a distance error between sensor data and map data is minimized using iterative closest point (ICP) logic.

4. The apparatus of claim 1, wherein the controller comprises a position fusion unit configured to fuse a vehicle pose output as results of the map matching and GPS information of a vehicle position predicted through dead reckoning.

5. The apparatus of claim 4, wherein:
 the controller comprises a fail-safe diagnosis unit configured to receive the vehicle position and flags output by the position fusion unit and to perform fail-safe diagnosis, and
 the fail-safe diagnosis unit is configured to perform the fail-safe diagnosis using a distribution chart configured with estimated positioning results in which positioning results at past timing have been projected on current timing and positioning results input at current timing.

6. The apparatus of claim 4, wherein the vehicle pose comprises one or more of longitude, latitude, heading, covariance, warning/fail/safe, flags and a lane offset.

7. A method of estimating a position in an automated valet parking system, the method comprising:
 capturing, by a front camera, a front image of a vehicle;
 processing, by a front camera processor, the front image of the vehicle received from the front camera
 downloading, by a controller, a map comprising an area set as a parking zone from a map data unit for storing a high definition map when an entry of the vehicle to a parking lot is identified;
 recognizing, by the controller, an automated valet parking (AVP) start position based on a short-distance lane and stop line recognized by a surround view monitor (SVM) processor, when it is determined that the vehicle has parked at the AVP start position by receiving GPS information or a signal, indicating that the vehicle has parked, from AVP infrastructure installed in the parking lot; and
 correcting, by the controller, a position measurement value of the vehicle by performing map matching based on results of a recognition and processing of the front camera processor and the SVM processor and the parking lot map of the map data unit,
 wherein in the predicting of the behavior of the vehicle, the controller predicts the behavior of the vehicle through dead reckoning based on the GPS information received from the GPS receiver and a vehicle steering wheel angle, yaw rate and wheel speed received from a vehicle sensor unit, and
 wherein in the correcting of the position measurement value, the controller performs the map matching based on lane fusion data in which a long-distance lane recognized by the front camera processor and the short-distance lane and stop line recognized by the SVM processor have been fused, parking lot map data from the map data unit, and vehicle behavior data for each time predicted through dead reckoning.

8. The method of claim 7, further comprising:
 predicting, by the controller, a behavior of the vehicle through dead reckoning when the AVP start position is recognized, and
 estimating, by the controller, an AVP initial position of the vehicle by fusing the position measurement value of the vehicle corrected through the map matching and the predicted behavior of the vehicle.

9. The method of claim 7, wherein in the correcting of the position measurement value, the controller computes a position and rotation correction quantity in which a distance error between sensor data and map data is minimized using iterative closest point (ICP) logic.

10. The method of claim 7, wherein in the estimating of the AVP initial position, the controller fuses a vehicle pose output as results of the map matching and GPS information of a vehicle position predicted through dead reckoning.

11. The method of claim 10, further comprising receiving, by the controller, the vehicle position and flags output as the result of the position fusion and performing fail-safe diagnosis,
    wherein in the performing of the fail-safe diagnosis, the controller performs the fail-safe diagnosis using a distribution chart configured with estimated positioning results in which positioning
    results at past timing have been projected on current timing and positioning results input at current timing.

* * * * *